United States Patent

[11] 3,626,012

| [72] | Inventors | John H. Fried;<br>Ian T. Harrison, both of Palo Alto, Calif. |
|---|---|---|
| [21] | Appl. No. | 741,900 |
| [22] | Filed | July 2, 1968 |
| [45] | Patented | Dec. 7, 1971 |
| [73] | Assignee | Syntex Corporation<br>Panama, Panama |

[54] NAPHTHYL ACETALDEHYDES AND DERIVATIVES THEREOF
8 Claims, No Drawings

[52] U.S. Cl................................................ 260/599,
260/609 R, 260/611 A, 260/612 D, 260/613 D,
260/340.9, 260/999, 260/520, 260/516, 260/479
R, 260/515 A, 260/515 R, 424/333, 424/339,
424/337

[51] Int. Cl........................................................ C07c 47/52
[50] Field of Search............................................ 260/599,
600, 611 A, 609, 609 R

[56]         References Cited
         UNITED STATES PATENTS
2,542,937   2/1951   Miescher et al. ..............   260/599
         OTHER REFERENCES
Stork et al. JACS 84 (1962) 284– 292

*Primary Examiner*—Bernard Helfin
*Attorneys*—Evelyn K. Merker and Gerard A. Blaufarb

ABSTRACT: β-(2-Naphthyl) acetaldehydes optionally substituted at the β position and/or positions C—1, 4, 5, 7 or 8; and/or position C—6 possess anti-inflammatory analgesic, antipyretic and anti-pruritic activity.

NAPHTHYL ACETALDEHYDES AND DERIVATIVES THEREOF

This invention pertains to novel naphthyl acetaldehydes and derivatives thereof; to methods of using thereof; and to processes of the preparation thereof.

More particularly, the present novel invention is directed to β-(2-naphthyl) acetaldehydes and derivatives thereof which exhibit anti-inflammatory, analgesic, antipyretic and antipruritic activity.

The present β-(2-naphthyl) acetaldehydes and derivatives thereof can be illustrated by the following formulas:

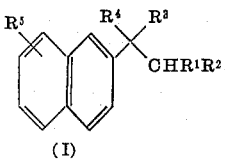 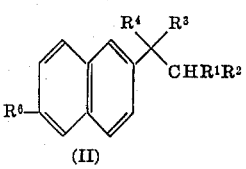

(I) (II)

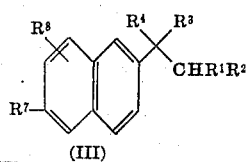

(III)

wherein, $R^1$ and $R_j^2$ are alkoxy,; or $R^1$ and $R^2$ taken together are =O, ethylenedioxy or 1', 2'-propylenedioxy;

one of $R^3$ and $R^4$ is hydrogen, the other is hydrogen, methyl ethyl or difluoromethlyl; or $R^3$ and $R^4$ taken together are methylene, halomethylene or ethylene;

$R^5$ (at position C–1,4,5,7, or 8) is hydrogen, alkyl, trifluoromethyl, fluoro, chloro hydroxy, a conventional hydrolyzable ester, oxyether or thioether;

$R^6$ is alkyl, cycloalkyl, hydroxymethyl, alkoxymethyl, trifluoromethyl, vinyl, ethynyl, fluoro, chloro, hydroxy, a conventional hydrolyzable ester, oxyether, thioether, formyl, acetyl or aryl; and each of $R^7$ and $R^8$ (at position C–1,4,5,7, or 8) is alkyl, fluoro, chloro, hydroxy, a conventional hydrolyzable ester, oxyether or thioether, provided that when one of $R^7$ and $R^8$ is hydroxy, oxyether or thioether, the other is the identical group or alkyl, fluoro, chloro or a conventional hydrolyzable ester.

In the preferred embodiment of the present invention, $R^1$ and $R^2$ are methoxy or ethoxy; or $R^1$ and $R^2$ taken together are =O; one of $R^3$ and $R^4$ is hydrogen, the other is hydrogen, methyl or difluoromethyl; or $R^3$ and $R^4$ taken together are methylene or difluoromethylene; $R^5$ (at position C–1,4,5,7, or 8) is methyl, ethyl, isopropyl, trifluoromethyl, fluoro, chloro, methoxy, methoxymethyloxy, difluoromethoxy, 4'-methoxytetrahydropyran-4'-yloxy, methylthio, methoxymethylthio or difluoromethylthio; $R^6$ is methyl, ethyl, isopropyl, cyclopropyl, trifluoromethyl, vinyl, ethynyl, fluoro, chloro, methoxy, methoxymethloxy, difluoromethoxy, 4'-methoxytetrahydropyran-4'-yloxy, methylthio, methoxymethylthio or difluoromethylthio; and each of $R^7$ and $R^8$ (at position C–1,4,5,7, or 8) is methyl, ethyl isopropyl, fluoro, chloro, trifluoromethyl, methoxy, methoxymethyloxy, difluoromethoxy, 4'-methoxytetrahydropyran-4'-yloxy, methylthio, methoxymethylthio, difluoromethylthio, provided that when one of $R^7$ or $R^8$ is methoxy, methoxymethyloxy, difluoromethoxy, 4'-methoxytetrahydropyran-4'-yloxy, methylthio, methoxymethylthio or difluoromethylthio, the other is the identical group or methyl, ethyl, isopropyl, fluoro or chloro.

An especially preferred group of naphthyl acetaldehydes of formulas I, II or III include β-(2-naphthyl), β-(2-naphthyl) β-methyl acetaldehyde, β-(2-naphthyl)-β-difluoromethyl acetaldehyde, β-(2-naphthyl)-β,β-methylene acetaldehyde, β-(2-napthyl)β,β-difluoromethylene acetaldehyde and the C–5, 7and/or C–6-methyl, -fluoro, -chloro, -trifluoromethyl, -methoxy and -methylthio derivatives thereof.

By the term "alkyl" is meant lower molecular weight, branched or straight chain hydrocarbon groups of six or less carbon atoms, such as methyl, ethyl, propyl, isopropyl, butyl, tertiarybutyl pentyl, hexyl, and the like. By the term "cycloalkyl" is meant cyclic hydrocarbon groups of three to seven carbon atoms such as cyclopropyl, cyclopentyl, cyclohexyl, and the like.

The term "alkoxy" defines a straight or branched chain hydrocarbon ether group of six or less carbon atoms, including methoxy, ethoxy, 2-propoxy, propoxy, butoxy, 3-pentoxy, and the like. By the term "alkoxymethyloxy" is meant methylether groups substituted with one alkoxy group; typical alkoxymethyloxy groups include methoxymethyloxy, ethoxymethyloxy, isopropoxymethyloxy, and the like. By the term "alkylthio" is meant straight or branched chain hydrocarbon thioether groups of six or less carbon atoms, including methylthio, ethylthio, propylthio, 2-propylthio, 2-butylthio, pentylthio, 3-hexylthio, and the like. By the term "alkoxymethylthio" is meant methylthio ether groups substituted with one alkoxy group, such as methoxymethylthio, ethoxymethylthio, 2-propoxymethylthio, and the like.

By the term "aryl" is meant unsubstituted and p-substituted phenyl derivatives, such as phenyl, p-tolyl, p-fluorophenyl, p-chlorophenyl, p-hydroxyphenyl p-methoxy-phenyl, p-ethylphenyl, and the like.

By the term "halomethylene" is meant mono- or dihalomethylene groups wherein halo is fluoro or chloro. The preferred halomethylenes include fluoromethylene, difluoromethylene, fluorochloromethylene and chloromethylene.

The term "conventional hydrolyzable ester," as used herein, denotes those hydrolyzable ester groups conventionally employed in the art, preferably those derived from hydrocarbon carboxylic acid or their salts. THe term "-hydrocarbon carboxylic acid" defines both substituted and unsubstituted hydrocarbon carboxylic aids. These acids can be completely saturated or possess varying degrees of unsaturation (including aromatic), can be of straight chain, branched chain or cyclic structure and preferably contain from one to 12 carbon atoms. Typical conventional hydrolyzable esters thus included within the scope of the term and the instant invention are acetate propionate, 2-methyl propionate, butyrate, valerate, caproate, enanthate, caprylate, benzoate, phenylacetate, diethylacetate, trimethylacetate, t-butylacetate, cyclohexylacetate, cyclopentylpropionate, adamantoate, bicyclo[2.2.2.]octyl carbonxylate, hemisuccinate, hemiadipate, hemiβ,β-dimethylglutarate and the like.

The term "oxyether" as used herein, denotes those ether groups conventionally employed in the art, preferably those derived from straight chain, branched chain, aromatic hydrocarbons and oxo heterocyclic hydrocarbons. The term "hydrocarbon" defines both saturated and unsaturated hydrocarbons. Those designated hydrocarbons are optionally substituted with groups such as hydroxy, alkoxy, halo, alkylthio, and the like. Preferably the hydrocarbons contain from one to 12 carbon atoms. Typical oxyethers thus include alkoxy, difluoromethoxy, alkoxymethyloxy, tetrahydrofuran-2'-yloxy, tetrahydropyran-2'-yloxy and 4'-alkoxytetrahydropyran-4'-yloxy.

the term "thioether," as used herein, denotes those thio ether groups conventionally employed in the art, preferably those derived from straight chain, branched chain, cyclic and aromatic hydrocarbons. The term "hydrocarbon" defines both saturated and unsaturated hydrocarbons. These hydrocarbons are optionally substituted with groups such as hydroxy, alkoxy, alkylthio, halo, and the like. Preferably the hydrocarbons contain from one to 12 carbon atoms. Typical thioethers thus include alkylthio, difluoromethylthio, alkoxymethylthio, and the like.

When one of $R^3$ and $R^4$ is hydrogen and the other is methyl, ethyl of difluoromethyl, the compounds of formulas I, II and III exist as pairs of enantiomorphs. Each enantiomorph or optical isomer of the compounds of formulas I, II and III is included within the present invention. In some instances, one enantiomorph exhibits greater anti-inflammatory, analgesic, antipyretic and/or antipruritic activity than the corresponding other enantiomorph, Nevertheless, the present compounds of formulas I, II and III that exist as pairs of enanthiomorphs can be administered as mixtures of enantiomorphs or as individual resolved enantiomorphs.

Preferably the individual resolved enantiomorphs or optical isomers of the compounds of formulas I, II, and III are prepared from the corresponding individual resolved enantiomorphs or optical isomers of the starting material.

Alternatively, the optical isomers can be resolved by conventional means, such as selective biological degradation. The resolved enantiomorph of formulas I, II and III and the corresponding resolved starting material will not necessarily have that same optical rotation although they will have the same absolute configuration.

The $\beta$-(2-naphthyl acetaldehydes of formulas I, II and III exhibit anti-inflammatory, analgesic, antipyretic and antipruritic activity. Accordingly, these compounds are employed in the present method of effecting treatment of inflammation, pain, pyrexia and pruritus in mammals.

These compounds are useful in the treatment of inflammation of the skin, respiratory tract, muscular-skeletal system, joints, internal organs, and tissues. Accordingly, these compounds are useful in the treatment of conditions characterize by inflammation, such as contact dermatitis, allergic conditions burns, rheumatism, contusion, arthritus, bone fracture, post-traumatic conditions and gout. In those cases in which the above conditions include pain, pyrexia and pruritus, coupled with the inflammation, the instant compounds are useful for relief of these conditions as well as the inflammation. The instant compounds are useful in the treatment of pain associated with postoperative conditions, posttraumatic conditions, postpartum conditions, dysemenorrhea, burns gout, contusions, neuralgia, neuritis, headache and rheumatic fever. As stated above these compounds also exhibit antipyretic activity; accordingly, these compounds are useful in the treatment of pyrexia where reduction of a fever is indicated, for example, in the treatment of high fevers associated with diseases such as rheumatic fever, bronchitis, pneumonia, typhoid fever, Hodgkin's disease, and the like. The present compounds are also useful in the treatment of pruritus where the condition exists contemporaneously with inflammation, pain and/or high fever. Moreover, the compounds are useful for treating pruritus per se.

The preferred manner of oral administration provides the use of a convenient daily dosage regimen which can be adjusted according to the degree of affliction. Generally, a daily dose of from 0.01 mg. to 20 mg. of the active compound per kilogram of body weight of the mammal is employed. Most conditions respond to treatment comprising a dosage level in the order of 1 mg. to 5 mg. per kilogram of body weight per day. For such oral administration, a pharmaceutically acceptable nontoxic composition is formed by the incorporation of any of the normally employed excipients. Suitable pharmaceutical excipients include starch, glucose, lactose, sucrose, gelatin, malt, rice flour chalk, silica gel, magnesium carbonate magnesium stearate, sodium stearate, glyceryl, monostearate, talc, sodium chloride, dried skim milk, glycerol, propylene glycel, water ethanol, and the like. These compositions take the form of solutions, suspensions, tablets pills, capsules powders, sustained release formulations and the like. In addition, these compounds can be administered in conjunction with other medicinal agents depending upon the specific condition being treated A measure of anti-inflammatory activity according to the carrageenin induced edema assay of Winter et al., *Proceedings of the Society for Experimental Biology and Medicine* 111, 544(1962) shows $\beta$-(6-methoxy-2-naphthyl)-$\beta$-methyl acetaldehyde to have over 4 times the activity of phenylbutazone. Similar standard assays to measure antipyretic activities show $\beta$-(6-methoxy-2-naphthyl)-$\beta$-methyl acetaldehydes to have 5 times the activity of aspirin in this activity.

Included within the compounds of formulas I, II and III are the novel $\beta$-(2-naphthyl) acetaldehyde derivatives of the following formulas:

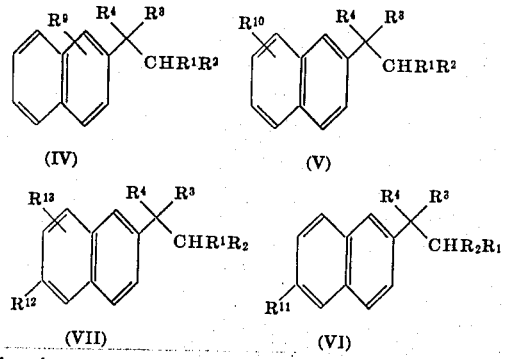

wherein, $R^1$ and $R^2$ are alkoxy; or $R^1$ and $R^2$ taken together are=0, ethylenedioxy or 1',2'-propylenedioxy;

one of $R^3$ and $R^4$ is hydrogen, the other is hydrogen, methyl, ethyl or difluoromethyl; or $R^3$ and $R^4$ taken together are methylene, halomethylene or ethylene;

$R^9$ (at position C–1,4 or 8) is trifloromethyl, fluoro, chloro, a conventional hydrolyzable ester or thioether;

$R^{10}$ (at position C–5 or 7) is alkyl, trifluoromethyl, fluoro, chloro, a conventional hydrolyzable ester, oxyether or thioether;

$R^{11}$ is alkyl, cycloalkyl, hydroxymethyl, alkoxymethyl, trifluoromethyl, vinyl ethynyl, fluoro, chloro, a conventional hydrolyzable ester, thioether, formyl acetyl or aryl; and Each of $R^{12}$ and $R^{13}$ (at position C–1,4,5,7 or 8) is alkyl, fluoro, chloro, a conventional hydrolyzable ester, or thioether, provided that when one of $R^{12}$ and $R^{13}$ is thioether, the other is the identical group or alkyl, fluoro, chloro, or a conventional hydrolyzable ester.

In the preferred embodiment of the compounds of formulas IV, V VI and VII, $R^1$ and $R^2$ are methoxy or ethoxy; or $R^1$ and $R^2$ taken together are =0;

one of $R^3$ and $R^4$ is hydrogen, the other is hydrogen, methyl ethyl or difluoromethyl; or $R^3$ and $R^4$ taken together are methylene or difluoromethylene;

$R^9$ is trifluoromethyl, fluoro chloro, methylthio, methoxymethylthio or difluoromethylthio;

$R^{10}$ (at position C–5 or 7) is methyl, ethyl, isopropyl, trifluoromethyl, fluoro, chloro, methoxy, methoxy-methyloxy, difluoromethoxy, 4'-methoxytetrahydropyran-4'-yloxy, methylthio, methoxymethylthio or difluoromethylthio;

$R^{11}$ is methyl, ethyl, isopropyl, cyclopropyl, trifluoromethyl, vinyl, ethynyl, fluoro, chloro, methylthio, methoxymethylthio or difluoromethylthio; and each of $R^{12}$ and $R^{13}$ position C–1,4,5,7or 8) is methyl ethyl, fluoro, chloro, methylthio, methoxymethylthio or difluoromethylthio, provided that when one of $R^{12}$ and $R^{13}$ is methylthio, methoxymethylthio or difluoromethylthio, the other is methyl, ethyl, fluoro or chloro.

An especially preferred group of novel $\beta$-(2-naphthyl) acetaldehyde derivatives are those of formulas V and VI in which $R^1$, $R^2$, $R^3$, $R^4$, $R^9$, $R^{10}$, $R^{11}$, $R^{12}$, and $R^{13}$ as defined in the above immediate paragraph The present compounds of formulas I, II and III (wherein $R^1$ and $R^2$ taken together are =0) are prepared from the corresponding 2-naphthyl acetic acid derivatives or esters thereof via a novel two-step process which can be illustrated by the following reaction scheme A:

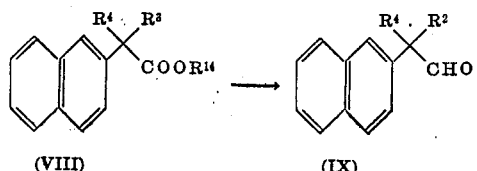

wherein, $R^3$ and $R^4$ are defined above and $R^{14}$ is hydrogen or alkyl. In the above scheme, the naphthyl moiety of the 2-naphthyl acetic acid derivatives of formula VIII and of the β-(2-naphthyl) acetaldehyde derivatives of formula IX are substituted with an $R^5$ group at position C–1,4,5,7 or 8; or and $R^6$ group at position C–6; or an $R^7$ group at position C–6 and an $R^8$ group at position C–1,4,5,7 or 8.

The novel process of Scheme A is conducted by treating the starting compound of formula VIII, a 2-naphthyl acetic acid or ester thereof, with lithium aluminum hydride in an inert organic ether solvent, such as diethyl ether, tetrahydrofuran, and the like. If free 2-naphthyl acid is used as a starting material, at least 0.75 molar equivalents of lithium aluminum hydride are used, and preferably about 1.0 to 2.5 molar equivalents are used. If an ester of a 2-naphthyl acetic acid is used as a starting material, at least 0.5 molar equivalents of lithium aluminum hydride are used, and preferably about 0.6 to 2.0 molar equivalents are used. The reduction is carried out at a temperature between 0° C. and the boiling point of the solvent employed, preferably between 15° C. to b 35° C. The second step of the above process consists of adding the reaction mixture to ethyl acetate, diluting the resulting mixture with water, filtering and evaporating it. The resulting residue is treated with chromium trioxide in acetic acid, pyridine or 8N sulfuric acid. The process is carried out at a temperature between 0° C. and 100° C., preferably the reaction temperature is between 5° C. and 30° C. At least two-thirds molar equivalents of chromium trioxide is used per molar equivalent of the acid starting material and preferably about 1.5 to about 2.5 molar equivalent of chromium trioxide are used.

Alternatively, the first step can be carried out by treating the compound of formula VIII with diborane in tetrahydrofuran at about room temperature. Two-thirds or more molar equivalents of diborane per molar equivalent of the starting compound are usually sufficient.

Alternatively, the second step can be carried out by treating the residue obtained from the first step of the residue with dicyclohexyl carbodiimide (DCC) and anhydrous phosphoric acid in dimethylsulfoxide at about room temperature. Generally three molar equivalents of DCC and one-half molar equivalents of anhydrous phosphoric acid are used per molar equivalent of the starting compound of formula VIII used in the first step.

At the completion of the a above process, the compound of formula IX, the product, is isolated by conventional means. For example, the reaction mixture is extracted with ethyl acetate; the extract is filtered, washed to neutrality, dried and evaporated. The product can be further purified by conventional techniques such as crystallization or chromatography.

Certain groups present in the starting compound of formula XII are reduced by lithium aluminum hydride or diborane. For example, an acetyl group is reduced to an α-hydroxy ethyl group and a formyl group is reduced to a hydroxy methyl group. These reduced groups are regenerated after the completion of the first step of the above process via an oxidation process using manganese dioxide (active) in an inert organic solvent such as acetone, petroleum ether, and the like, at about room temperature.

In the second step o the above process, certain groups will be oxidized. For example, hydroxy methyl will be oxidized to formyl methyl and hydroxy will be oxidized to formyl. These groups can be advantageously protected by esterifying these groups prior to the process of Scheme A. The groups can be regenerated after the above process by hydrolysis of the esterified groups such as with a 48 percent hydrogen bromide-acetic acid solution.

The acetals of the compounds of formula IX are prepared by treating the aldehyde products with alcohols, such as methanol, ethanol, 2-propanol, propanol, 2-pentanol, ethylene glycol, 1,2-propylene glycol, and the like, in the presence of an acid catalyst, such as p-toluenesulfonic acid, and the like.

When a resolved optical isomer of a 2-naphthyl acetic acid starting compound of formula VIII is employed in the above process, the corresponding resolved optical isomer of the compound of formula IX is obtained.

The 2-naphthyl acetic acid starting materials of formula VIII are known and can be prepared by any one of several methods fully described in our copending U.S. application No. 608,997, filed Jan. 13, 1967 No. 694,771, filed Dec. 7, 1967 and No. 741,858, filed July 2, 1968 ("5-SUBSTITUTED2-NAPHTHYL ACETIC ACID DERIVATIVES, AND COMPOSITIONS AND METHODS OF USE THEREOF;" filed on even date herewith).

One method is to treat a tetralone, optionally substituted at position C–5,6,7, or 8 or substituted at position C–6 and C–5,7, or 8 sequentially with (1) an alkyl carbonate and an alkali metal hydride, (2) an alkali metal hydride and an α-haloacetic acid and (3) an aqueous mineral acid to obtain the corresponding 2-(carbonxymethyl)-1-tetralone. The latter is reduced wit sodium borohydride to form the corresponding 1,2,3,4-tetrahydro1-hydrox-2-naphthyl acetic acid; this resulting product is hydrogenolyzed with hydrogen in the presence of a hydrogenation catalyst; the resulting product is esterified and then dehydrogenated with palladium charcoal catalyst at about 180° C. to furnish the corresponding 2-naphthyl acetic acid ester derivative.

The starting compounds of formula VIII that are substituted at position C–1 or disubstituted at positions C–1,6 are prepared from the corresponding 2-(carboxymethyl)-1-tetralones by treating the latter with (1) a phosphorous pentahalide to halogenate at the C–1 position of with (2) alkyl magnesium bromide and then with aqueous mineral acid to alkylate at the C–1 or with (3) trialkyl orthoformate in the presence of an acid catalyst to add an alkoxy group at position C–1; and then dehydrogenating the resulting halogenated or alkylated or alkoxylated product by refluxing with 2,3-dichloro-5,6-dicyano-1,4-benzoquinone.

The starting compounds of formula VIII substituted at position C–4 or disubstituted at positions C–4 and 6 are prepared from unsubstituted and 6-substituted 3-(carboxymethyl) tetralones respectively via the processes used to prepare 1-substituted -2-naphthyl acetic acids from 2-(carboxymethyl) tetralones. 3-(carboxymethyl)tetralones are prepared via the process described in J. Chem. Soc. (London) 1922, 1717.

The compounds of formula VIII substituted at the α-position are prepared from the corresponding α-unsubstituted compounds of formula VIII by esterifying the latter, and treating it with ethyl formate and sodium metal to obtain the corresponding α,α-hydroxymethylene derivative. The latter is treated with sodium hydride, then with chlorine gas, then with chromium trioxide in acetic acid and then heated to yield the corresponding α-chloro derivative. The α-chloro derivative is refluxed in sodium hydroxide, esterified with diazomethane, oxidized with chromium trioxide in acetic acid and coupled by refluxing with difluoromethylene triphenyl phosphorane in benzene to obtain the corresponding α,α-difluoromethylene derivatives.

The α-methyl substituents are added to the α-unsubstituted compounds of formula VIII by esterifying the latter and treating it with sodium hydride and alkyl halide, such as methyl iodide. The α-difluoromethyl substituent is added by treating the α-unsubstituted compounds of formula VIII successively with sodium hydride and diethyl carbonate, then with chlorodifluoromethane, then with aqueous 5 % sodium hydroxide at 75° C. and then finally heating the resulting product to about 150° C. to yield the corresponding α-difluoromethyl derivatives of formula VIII.

The α,α-methylene substituents are introduced by treating the α-unsubstituted compounds of formula VIII with formaldehyde and an alkali metal hydroxide. The α,α-ethylene substituents are introduced by refluxing the corresponding α,α-methylene derivatives of formula VIII with diiodomethane in the presence of zinc-copper couple.

The 2-naphthyl acetic acids of formula VIII that exist as enantiomorphs can be resolved by preparing the alkaloid base salts of the latter, resolving the resulting diastero-isomer salts by fractional crystallization and cleaving the resolved salts. The optical rotation of a particular 2-naphthyl acetic acid is determined by polarimetry.

The following examples are included to further illustrate the present invention and are not intended as limitations of the present invention.

EXAMPLE 1

To a mixture of 0.4 g. of lithium aluminum hydride and 100 ml. of ethyl ether, a mixture of 2.3 g. of a 6-methoxy-2-naphthyla-α-methyl acetic acid and 100 ml. of ethyl ether The mixture is stirred at 0° C. for 30 minutes, then 10 ml. of ethyl acetate are added; 1 hour later 18.5 ml. of water are added. The resulting mixture is filtered and evaporated under reduced pressure. The resulting residue is added to a mixture of 10 g. of chromium trioxide and 1 liter of pyridine. The resulting reaction mixture is stirred under anhydrous conditions for 24 hours at 25° C, then 1 liter of ethyl acetate is added. The resulting ethyl acetate mixture is filtered, washed with an aqueous saturated solution of sodium bisulfite and water to neutrality, dried over sodium sulfate and evaporated under reduced pressure to yield α-(6-methoxy-2-naphthyl)62 -methyl acetaldehyde.

Similarly,
α-(1-trifluoromethyl-2-naphthyl)-β-methyl acetalde-hyde,
β-(4-fluoro-2-naphthyl)-β-ethyl acetaldehyde,
β-(5-methoxy-2-naphthyl)-β-methyl acetaldehyde,
β-(5-methyl-2-naphthyl) acetaldehyde,
β-(5-chloro-2-naphthyl)-β-methyl acetaldehyde,
β-(5-methylthio-2-naphthyl)-β,β-methylene acetaldehyde,
β-(6-methylthio-2-naphthyl)-β-difluoromethyl acetaldehyde
β-(6-methyl-2-naphthyl)-β-methyl acetaldehyde
β-(6-methyl-2-naphthyl)-β-methyl acetaldehyde,
β-(6-ethynyl -2-naphthyl)-β-methyl acetaldehyde,
β-(6-acetyl-2-naphthyl)-β,β-methylene acetaldehyde,
β-(6-chloro-2-naphthyl)-β-methyl acetaldehyde,
β-(7-methyl-2-naphthyl)-β-methyl acetaldehyde,
β-(7-methoxy-2-naphthyl) acetaldehyde,
β-(7-chloro-2-naphthyl)-β-methyl acetaldehyde,
β-(7-methylthio-2-naphthyl)-β,β-methylene acetaldehyde,
β-(8-ethylthio-2-naphthyl)-β-ethyl acetaldehyde, and
β-(1-fluoro-6-methoxy-2-naphthyl)-β-methyl acetaldehyde, are prepared from the corresponding substituted 2-naphthyl acetic acids.

EXAMPLE 2

A mixture of 230 g. of 5-methoxy-2-naphthyl acetic acid, 57 g. of lithium aluminum hydride and 10 liters of tetrahydrofuran is stirred for 2 hours at 0° C., then 1 liter of ethyl acetate is added. One hour after, 500 ml. of water is added to the resulting mixture, the mixture is stirred, filtered, and evaporated under vacuum. The residue is added to a mixture of 620 g. of dicyclohexyl carbodiimide, 50 g. of anhydrous phosphoric acid and 2 liters of dimethylsulfoxide. The resulting mixture is stirred for 8 hours, then added to water, filtered to remove dicyclohexyl urea and extracted with ether. The combined ether extracts are filtered, washed with water to neutrality, dried over sodium sulfate and evaporated to yield β-(5-methoxy-2-naphthyl) acetaldehyde.

Similarly,
β-(1-methoxy-2-naphthyl) acetaldehyde,
β-(4-difluoromethylthio-2-naphthyl)-β-methyl acetaldehyde,
β-(5-methylthio-2-naphthyl)-β-methyl acetaldehyde,
β-(5-chloro-2-naphthyl) acetaldehyde,
β-(5-trifluoromethyl-2-Naphthyl)-β,β-difluoromethylene acetaldehyde,
β-(6-fluoro-2-naphthyl)-β-methyl acetaldehyde,
β-(6-methyl-2-naphthyl) acetaldehyde,
β-(6-methoxy-2-naphthyl) acetaldehyde,
β-(6-difluoromethoxy-2-naphthyl)-β-difluoromethyl acetaldehyde,
β-(6-methoxy-2-naphthyl)-β-ethyl acetaldehyde,
β-(6-chloro-2-naphthyl)-β-methyl acetaldehyde,
β-(7-methoxy-2-naphthyl)-β-methyl acetaldehyde,
β-(7-methylthio-2-naphthyl)-β-ethyl acetaldehyde,
β-(7-chloro-2-naphthyl)-β,β-methylene acetaldehyde,
β-(8-trifluoromethyl-2-naphthyl)-β,β-methylene acetaldehyde, and
β-(5,6-dimethyl-2-naphthyl)-β-methyl acetaldehyde are prepared from
1-methoxy-2-naphthyl acetic acid,
4-difluoromethylthio-2-naphthyl-α-methyl acetic acid,
5-methylthio-2-naphthyl-α-methyl acetic acid,
5-chloro-2-naphthyl acetic acid,
5-trifluoromethyl-2-naphthyl-α,α-difluoromethylene acetic acid,
6-fluoro-2-naphthyl-α-methyl acetic acid,
6-methyl-2-naphthyl acetic acid,
6-methoxy-2-naphthyl acetic acid,
6-difluoromethoxy-2-naphthyl -α-difluoromethyl acetic acid,
6-methoxy-2-naphthyl-α-ethyl acetic acid,
6-chloro-2-naphthyl-α-methyl acetic acid,
7-methoxy-2-naphthyl-α-methyl acetic acid,
7-methylthio-2-naphthyl-α-ethyl acetic acid,
7-chloro-2-naphthyl-α,α-methylene acetic acid,
8-trifluoromethyl-2-naphthyl-α,α-methylene acetic acid, and
5,6-dimethyl-2-naphthyl-α-methyl acetic acid, respectively, by means of the above process.

EXAMPLE 3

A mixture of 46 g. of 7-methoxy-2-naphthyl-α-methyl acetic acid, 6 g. of diborane and 220 ml. of tetrahydrofuran are stirred for 8 hours at room temperature (about 23° C.). The mixture is allowed to stand for 1 hour after being diluted with 50 ml. of aqueous acetone, then 300 ml. of diethyl ether are added. The resulting mixture is washed with water, dried over sodium sulfate and evaporated. The resulting residue is added to a mixture of 10 g. of chromium trioxide and 100 ml. of glacial acetic acid. The resulting mixture is stirred under anhydrous conditions for 24 hours at 25° C.; then 1 liter of ethyl acetate is added. The mixture is then filtered, washed with an aqueous saturated solution of sodium bisulfite and water to neutrality, dried over sodium sulfate and evaporated under reduced pressure to yield β-(7-methoxy-2-naphthyl)-β-methyl acetaldehyde.

Similarly,
β-(5-methyl-2-naphthyl)-β-methyl acetaldehyde,
β-(5-difluoromethoxy-2-naphthyl)-β-methyl acetaldehyde,
β-(5-methylthio-2-naphthyl) acetaldehyde,
β-(6-methyl-2-naphthyl)-β-methyl acetaldehyde,
β-(6-chloro-2-naphthyl)-β-difluoromethyl acetaldehyde,
β-(6-methylthio-2-naphthyl)-β,β-methylene acetaldehyde,
β-(6-trifluoromethyl-2-naphthyl)-β-methyl acetaldehyde,
β-(7-methoxy-2-naptyl)-β-methyl acetaldehyde,
β-(7-methyl-2-naphthyl)-β-methyl acetaldehyde,
β-(7-fluoro-2-naphthyl) acetaldehyde,
β-(7-trifluoromethyl-2-naphthyl)-β-methyl acetaldehyde,
β-(1-chloro-2-naphthyl)-β-ethyl acetaldehyde,
β-(4-ethoxy-2-naphthyl)-β,β-ethylene acetaldehyde,
β-(6,7-dimethoxy-2-naphthyl)-β-methyl acetaldehyde, and
β-(8-hydroxy-2-naphthyl)-β-methyl acetaldehyde, are prepared from
5-methyl-2-naphthyl-α-methyl acetic acid,
5-difluoromethoxy-2-naphthyl-α-methyl acetic acid,
5-methylthio-2-naphthyl acetic acid,
6-methyl-2-naphthyl-α-methyl acetic acid,
6-chloro-2-naphthyl-α-difluoromethyl acetic acid,
6-methylthio-2-naphthyl-α,α-methylene acetic acid
6-trifluoromethyl-2-naphthyl-α-methyl acetic acid,
7-methoxy-2-naphthyl-α-methyl acetic acid,
7-methyl-2-naphthyl-α-methyl acetic acid,
7-fluoro-2-naphthyl acetic acid,
7-trifluoromethyl-2-naphthyl-β-methyl acetic acid, 1-chloro-2-naphthyl-α-ethyl acetic acid,
4-ethoxy-2-naphthyl-α,α-ethylene acetic acid,
6,7-dimethoxy-2-naphthyl-α-methyl acetic acid, and
8-hydroxy-2-naphthyl-α-methyl acetic acid, respectively, by means of the above process.

EXAMPLE 4

A mixture of 5 g. of β-(6-methyl-2-naphthyl)-β-methyl acetaldehyde, 150 ml. of anhydrous benzene, 60 ml. of ethylene glycol (distilled over sodium hydroxide) and 0.8 g. of p-toluenesulfonic acid monohydrate is refluxed for 12 hours with a water trap. Aqueous sodium bicarbonate solution is then added to the cooled mixture and the organic phase is separated, washed with water, dried over anhydrous sodium sulfate and evaporated to dryness to yield α,α-ethylenedioxy-β-(6-methyl-2-naphthyl)-β-methyl ethane which is recrystallized from acetone:hexane.

EXAMPLE 5

A mixture of 21 g. of β-(6-methoxy-2-naphthyl)-β-methyl acetaldehyde, 500 ml. of ethanol and 20 drops of perchloric acid are allowed to stand for 8 hours at room temperature under anhydrous conditions. The mixture is then diluted with 500 ml. of aqueous 1 percent sodium bicarbonate; and extracted with methylene chloride. The combined extracts are washed with water to neutrality, dried over magnesium sulfate and evaporated to yield α,α-dimethoxy-β-(6-methoxy-2-naphthyl)-β-methyl ethane.

EXAMPLE 6

The anti-inflammatory activity of β-(6-methoxy-2-naphthyl)-β-methyl acetaldehyde was compared with that of phenylbutazone by means of a carageenin-induced rat paw inflammation test described by C. A. Winter et. al. *Proceedings in Experimental Biology & Medicine* 111, 544–47 (1962).

The test was modified in that female rats weighing 80–90 grams were employed and the degree of inflammation was measured 1 hour after the injection of carageenin in units of rear paw weight rather than rear paw volume. The results are shown in the following table.

| No. of Rats | Dose Range Tested mg./rat | Relative Potency to Phenylbutazone (Phenylbutazone=1) |
| --- | --- | --- |
| 33 | 0.1–0.9 | 4 |

EXAMPLE 7

The antipyretic activity of β-(6-methoxy-2-naphthyl)-β-methyl acetaldehyde was compared to the antipyretic activity of aspirin.

Antipyretic activity—Female rats weighting 90–100 grams were used. The "normal" rectal temperature of the rats was recorded at hour 0, followed by the injection of 2 ml. of yeast suspension (the yeast suspension is prepared by suspending one cake of Fleischman's yeast in 22 ml. 0.9 percent NaCl) subcutaneously (1 ml. dorsally, 1 ml. ventrally). The injection sites are massaged to spread the suspension beneath the skin The yeast injection induces elevated body temperature. At hour 17, the rats were massaged again to stimulate a further increase in body temperature. (It was found that handling the rats at the time the second temperature as taken resulted in a rise in body temperature. At hour 18, the second rectal temperature was recorded, after which the test material was administered orally by gavage in 1 ml. aqueous vehicle. (The aqueous vehicle consists of 0.9 percent NaCl, 0.4 percent polysorbate 80, 0.5 percent carboxymethyl cellulose, 0.9 percent benzyl alcohol and water.) The third rectal temperature was obtained 2 hours after administration of the test material.

The degree of antipyretic activity was measured as a reduction in temperature (°F.) from the second to the third temperature readings (temperature at hour 18—temperature at hour 20) with respect to a control. The results are shown in the following table.

| Compound | No. of Rats | Doses Tested mg./rat | Relative Potency to Aspirin (Aspirin=1) |
| --- | --- | --- | --- |
| β-(6-methoxy-2-naphthyl)-β-methyl acetaldehyde | 10 | 0.2 & 0.6 | 5 |

EXAMPLE 8

| Ingredients | Quantity per tablet, mg. |
| --- | --- |
| β-(7-methyl-2-naphthyl)-β-methyl acetaldehyde | 5 |
| sucrose | 245 |

The above ingredients are thoroughly mixed and processed into single scored tablets, one tablet being administered every 3 to 4 hours.

EXAMPLE 9

| Ingredients | Quantity per tablet, mg. |
| --- | --- |
| β-(6-methoxy-2-naphthyl)-β-methyl acetaldehyde | 10 |
| Cornstarch | 100 |
| lactose | 388 |
| magnesium stearate | 2 |

The above ingredients are mixed intimately and pressed into single scored tablets.

EXAMPLE 10

| Ingredients | Quantity per capsule, mg. |
| --- | --- |
| β-(5-methoxy-2-naphthyl)-β-methyl acetaldehyde | 15 |
| lactose | 225 |
| dectrose | 10 |

The above ingredients are mixed and introduced into a No. 1 hard-shell gelatin capsule.

What is claimed is:

1. A compound selected from the group of compounds represented by the formula:

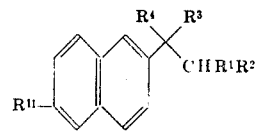

wherein
R¹ and R² are alkoxy having up to six carbons; or R¹ and R² taken together are oxo,
one of R³ and R⁴ is hydrogen, and the other is hydrogen, methyl, ethyl, or difluoromethyl; or R³ and R⁴ taken together are methylene, halomethylene or ethylene; and
R¹¹ is alkyl having up to six carbons, cycloalkyl having from three to seven carbons, hydroxymethyl, alkoxymethyl having up to seven carbons, trifluoromethyl, vinyl ethynyl, fluoro, chloro, hydroxy, alkylthio having up to six carbons, phenyl, p-tolyl or p-ethylphenyl.

2. A compound selected from the group of compounds represented by the formula:

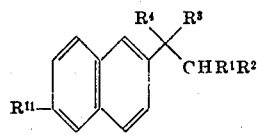

wherein
R¹ and R² are methoxy or ethoxy; or R¹ and R² taken together are oxo;
one of R³ and R⁴ is hydrogen, and the other is hydrogen methyl, ethyl or difluoromethyl; or R³ and R⁴ taken together are methylene or difluoromethylene; and
R¹¹ is methyl, ethyl, isopropyl, cyclopropyl, trifluoromethyl, vinyl, ethynyl, fluoro, chloro, methylthio, methoxymethylthio or difluoromethylthio.

3. A compound of claim 2 wherein
one of R³ and R⁴ is hydrogen, the other is hydrogen, methyl or ethyl; and
R¹¹ is fluoro, chloro, methyl, trifluoromethyl, methylthio, methoxymethylthio or difluoromethylthio.

4. As a compound of claim 3, β-(6-methyl-2-naphthyl)-acetaldehyde.

5. As a compound of claim 3, β-(6-methyl-2-naphthyl)-β-methylacetaldehyde.

6. As a compound of claim 3, β-(6-fluoro-2-naphthyl)-β-methylacetaldehyde.

7. As a compound of claim 3, β-(6-chloro-2-naphthyl)-β-methylacetaldehyde.

8. As a compound of claim 3, β-(6-methylthio-2-naphthyl)-β-methylacetaldehyde.

* * * * *

UNITED STATES PATENT OFFICE
CERTIFICATE OF CORRECTION

Patent No. 3,626,012      Dated December 7, 1971

Inventor(s) J.H. Fried and I.T. Harrison

It is certified that error appears in the above-identified patent and that said Letters Patent are hereby corrected as shown below:

Column 1, line 29, "$Rj^2$" should read -- $R^2$ --.

Column 2, line 73, "of" should read -- or --.

Column 4, formula IX, that portion of the formula reading

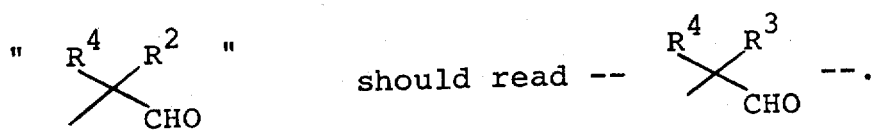

Column 6, line 12, -- di -- should appear before substituted..

Column 7, line 23, "α" should read -- β -- and "62" should read -- β --; Column 7, line 34, "6-methyl" should read -- 6-methoxy --.

Column 8, line 75, "β-methyl" should read -- α-methyl --.

Signed and sealed this 25th day of December 1973.

(SEAL)
Attest:

EDWARD M. FLETCHER, JR.         RENE D. TEGTMEYER
Attesting Officer               Acting Commissioner of Patents